(12) United States Patent
Williamson et al.

(10) Patent No.: US 12,441,485 B2
(45) Date of Patent: Oct. 14, 2025

(54) BONDING TAB ASSEMBLIES PROVIDING LIGHTNING STRIKE PROTECTION FOR COMPOSITE AIRCRAFT PROPELLERS

(71) Applicant: Textron Aviation Inc., Wichita, KS (US)

(72) Inventors: Gregory Williamson, Wichita, KS (US); Brian Cozine, Wichita, KS (US); Amber Whittaker, Wichita, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 183 days.

(21) Appl. No.: 18/475,691

(22) Filed: Sep. 27, 2023

(65) Prior Publication Data

US 2025/0100710 A1    Mar. 27, 2025

(51) Int. Cl.
*B64D 45/02* (2006.01)
*B64C 11/26* (2006.01)

(52) U.S. Cl.
CPC ............. *B64D 45/02* (2013.01); *B64C 11/26* (2013.01)

(58) Field of Classification Search
CPC ......... B64D 45/02; B64C 11/26; B64C 11/20; F01D 1/06; F03D 80/30
USPC ........................................................ 361/218
See application file for complete search history.

(56) References Cited

U.S. PATENT DOCUMENTS

| 9,702,255 | B2 | 7/2017 | Martin et al. |
| 2009/0038819 | A1* | 2/2009 | Molbech ................ H02G 13/40 174/2 |
| 2015/0147183 | A1* | 5/2015 | Martin .................... B64D 45/02 29/889.6 |

\* cited by examiner

*Primary Examiner* — Danny Nguyen
(74) *Attorney, Agent, or Firm* — Nixon & Vanderhye, P.C.

(57) ABSTRACT

Lightning strike protection for composite propellers is provided by a bonding tab assembly which is electrically bonded to an electrically conductive protective band fixed to a leading edge of the composite propeller blade. The bonding tab establishes an electrically conductive path for a lightning strike on the protective band to be directed to the propeller hub thereby providing lightning strike protection to the propeller. The bonding tab assembly may include a mounting bracket having a lower mounting flange and an upright mounting plate, the lower mounting adapted to being attached to a counterweight clamp attached to a metallic blade collar surrounding the propeller blade shank. A bonding tab is attached to the upright mounting plate of the mounting bracket and adapted to being brought into spring-biased contact with a portion of the protective metal band affixed to the leading edge of the composite propeller blade.

14 Claims, 6 Drawing Sheets

BONDING TAB ASSEMBLIES PROVIDING LIGHTNING STRIKE PROTECTION FOR COMPOSITE AIRCRAFT PROPELLERS

FIELD

The embodiments disclosed herein relate generally to lightning strike protection for composite propeller blades. In preferred forms, the embodiments disclosed herein relate to a bonding tab assembly which electrically bonds an electrically conductive protective band fixed to a leading edge of an aircraft propeller blade to the associated propeller hub thereby providing lightning strike protection to the propeller blade.

BACKGROUND

Composite materials, e.g., carbon fiber-reinforced plastics materials, are increasingly being used in the fabrication of aeronautical components due to the high strength and low weight that such materials offer. However, carbon fiber-reinforced plastic materials are more sensitive to lightning damage due to their partial electrical conductivity, i.e., since the carbon fibers are electively conductive while the plastic matrix material in which the carbon fibers are embedded are electively insulating.

Aircraft propeller blades are known to be particularly susceptible to in-flight lightning strikes. For this reason, some form of lightning strike protection is necessary in order to prevent damage to the propeller. Lightning strike protection is thus especially necessary for propeller blades formed of a composite material, such as a carbon fiber-reinforced plastics material. For this reason, it has been proposed that propellers formed of a composite material with partial electrical conductivity be provided with some form of lightning protection, e.g., a metal surface film of copper or aluminum. Further protection to the propeller blade may also be achieved by covering or encasing the carbon fiber-reinforced plastics material with a glass fiber composite plastics material due to the high dielectric properties of the glass fibers.

Recently it has been proposed in U.S. Pat. No. 9,702,255 (the entire contents of which are expressly incorporated hereinto by reference) that propeller blades formed of composite fiber-reinforced materials may be protected from lightning strikes by an electrically conductive (metal) strip or band that is affixed to the leading edge of the composite propeller. The electrically conductive strip is flared at the shank (root) of the blade and defines a gap with a snap ring receiving groove which allows lightning to arc therebetween.

While the prior proposals for lightning protection of composite propeller blades may be satisfactory for certain propeller assembly designs, there is still a need for improvement. It is towards providing such a need that the embodiments disclosed herein are directed.

SUMMARY

In general the embodiments disclosed herein are directed toward lightning strike protection for composite propellers whereby a bonding tab assembly is electrically bonded to an electrically conductive protective band fixed to a leading edge of the aircraft propeller blade providing a path for a lightning strike to be directed to the propeller hub thereby providing lightning strike protection to the propeller. According to some embodiments, the bonding tab assembly will include a mounting bracket having a lower mounting flange and an upright mounting plate. The lower mounting flange is adapted to being attached to a counterweight clamp surrounding a blade collar attached to the shank of the propeller blade. A bonding tab is attached to the upright mounting plate of the mounting bracket and adapted to being brought into spring-biased contact with a portion of the protective metal band affixed to the leading edge of the composite propeller blade.

According to certain embodiments, the bonding tab may be a single strip of metal formed into a P-shaped geometric configuration. The single strip of metal may thus include a central region which is bent into a leading arcuate contact pad that is adapted to be brought into spring-biased contact with the portion of the protective metal band affixed to the leading edge of the propeller blade. The single strip of metal may also include opposite tail portions that are stacked and attached to the upright mounting plate of the mounting bracket.

Some embodiments will include a mounting bracket that is adapted to being positionally adjusted towards and away from the protective metal band to adjust spring-biased force of the bonding pad thereagainst. In this regard, at least one or a parallel pair of elongate aperture(s) are provided which receive a bolt therewithin to threadably attach the mounting flange of the bracket to the counterweight clamp. The at least one or pair of elongate aperture(s) may be oriented in a direction to allow adjustments of the mounting bracket towards and away from the propeller blade.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
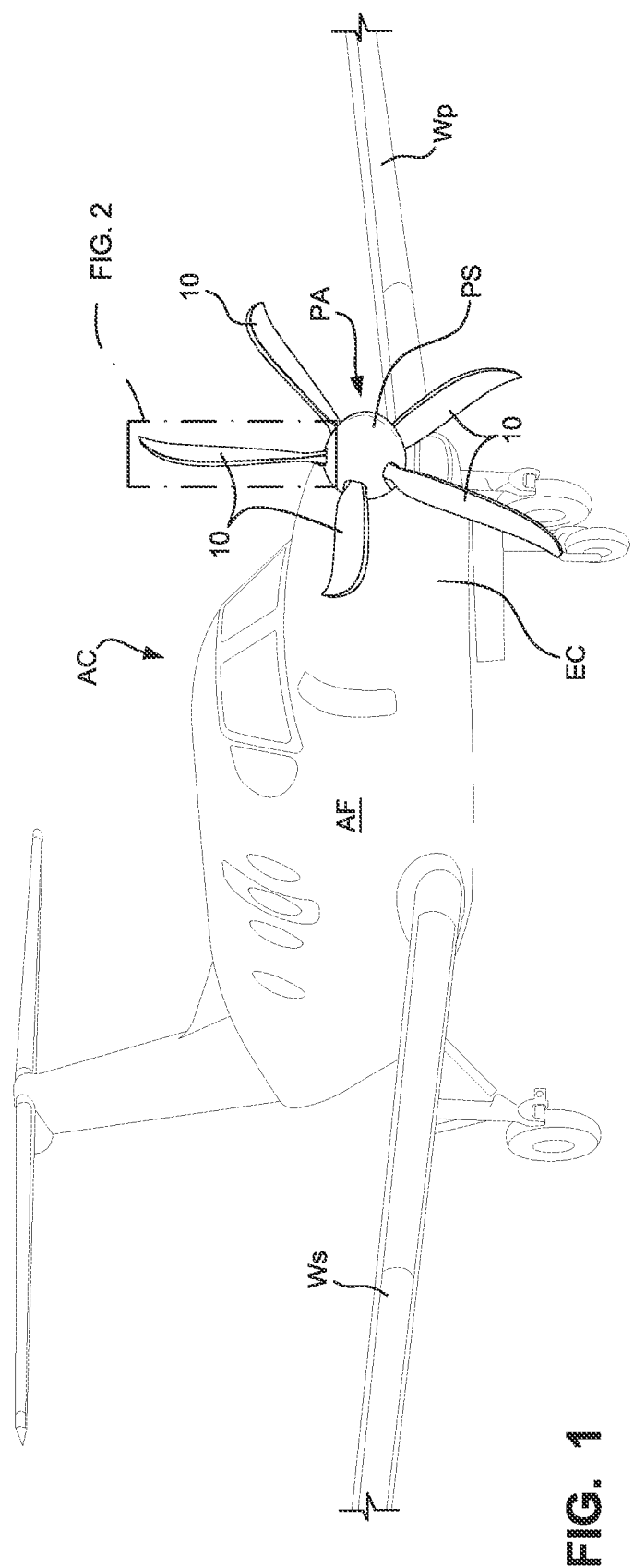
FIG. 1 is a front perspective environmental view of an exemplary aircraft having a multi-blade propeller system which includes the bonding tab assemblies in accordance with an embodiment of the invention to provide lightning strike protection according to the embodiments disclosed herein.

Accompanying FIG. 1 shows an exemplary aircraft AC having a fuselage AF and port and starboard wings Wp and Ws, respectively. The forward end of the fuselage AF includes an engine cowling EC that encloses a powerplant (e.g., a turbine or piston engine) which in turn drives a propeller assembly PA that includes a number of symmetrically distributed propeller blade assemblies 10. A propeller spinner PS is provided to aerodynamically shield the internal components of the propeller assembly PA. For purposes of illustration and discussion, the aircraft AC as shown in FIG. 1 is powered by a single engine with a five-bladed propeller assembly PA (i.e., a propeller assembly PA having five symmetrically distributed propeller blade assemblies 10). The aircraft AC may however be provided with multiple engines (e.g., mounted on the port and starboard wings Wp, Wx, respectively) and/or may include more or less than the depicted five propeller blade assemblies 10.

Figure 2:
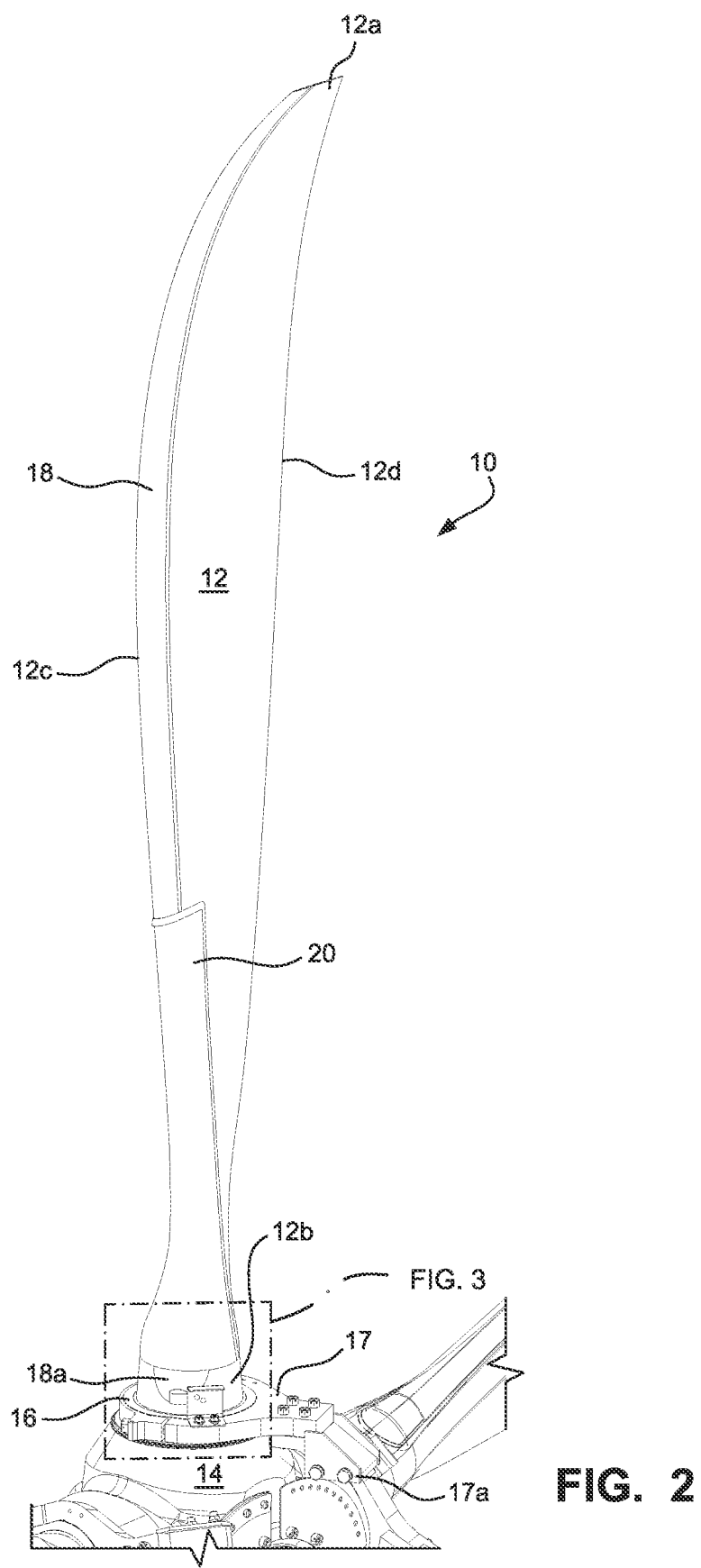
FIG. 2 is an enlarged perspective view of an exemplary propeller blade employed in the propeller system shown in FIG. 1 which includes a bonding tab assembly in accordance with an embodiment of the invention.

A representative propeller blade assembly 10 that is a component part of the propeller assembly PA is depicted in accompanying FIG. 2 as including a composite propeller blade 12 having a distal tip 12a and a proximal shank 12b that is supported for rotation within a metal propeller hub 14. A metallic blade collar 16 is attached to the shank 12b. A counterweight clamp 17 surrounds the blade collar 16 and supports a counterweight 17a (see FIG. 2). The propeller blade 12 also defines leading and trailing edges 12c and 12d, respectively. An electrically conductive (e.g., metal) protective band 18 is affixed to the leading edge 12c of the propeller blade 12 and extends continuously therealong between the distal tip 12a and proximal shank 12b. The protective band 18 includes a proximal flared region 18a near the shank 12b. A de-ice boot 20 may be provided at the proximal section of the propeller blade 12 which covers a subjacent section of the protective band 18.

Figure 3:
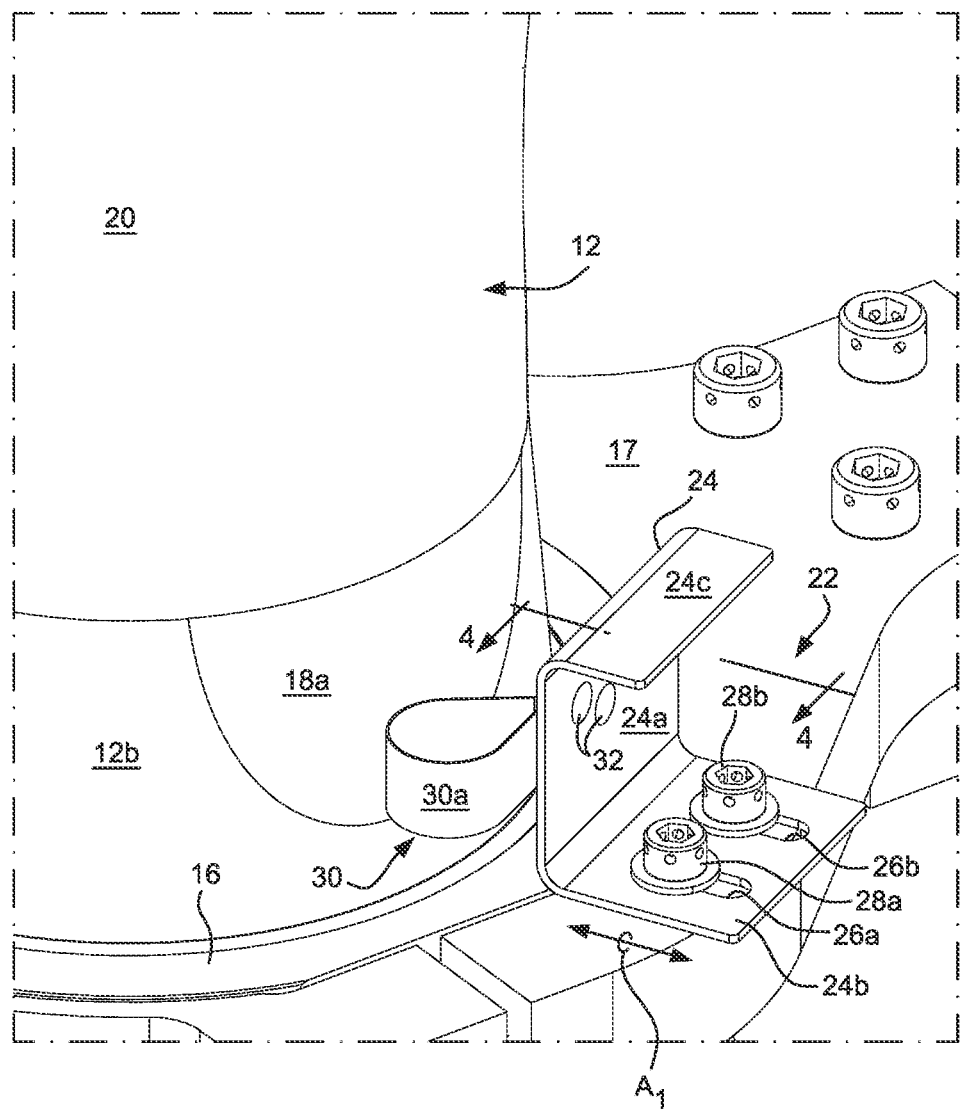
FIG. 3 is a further enlarged perspective view of the hub assembly and its associated bonding tab assembly in accordance with an embodiment of the invention which is employed with the exemplary propeller blade show in FIG. 2.
Figure 4:
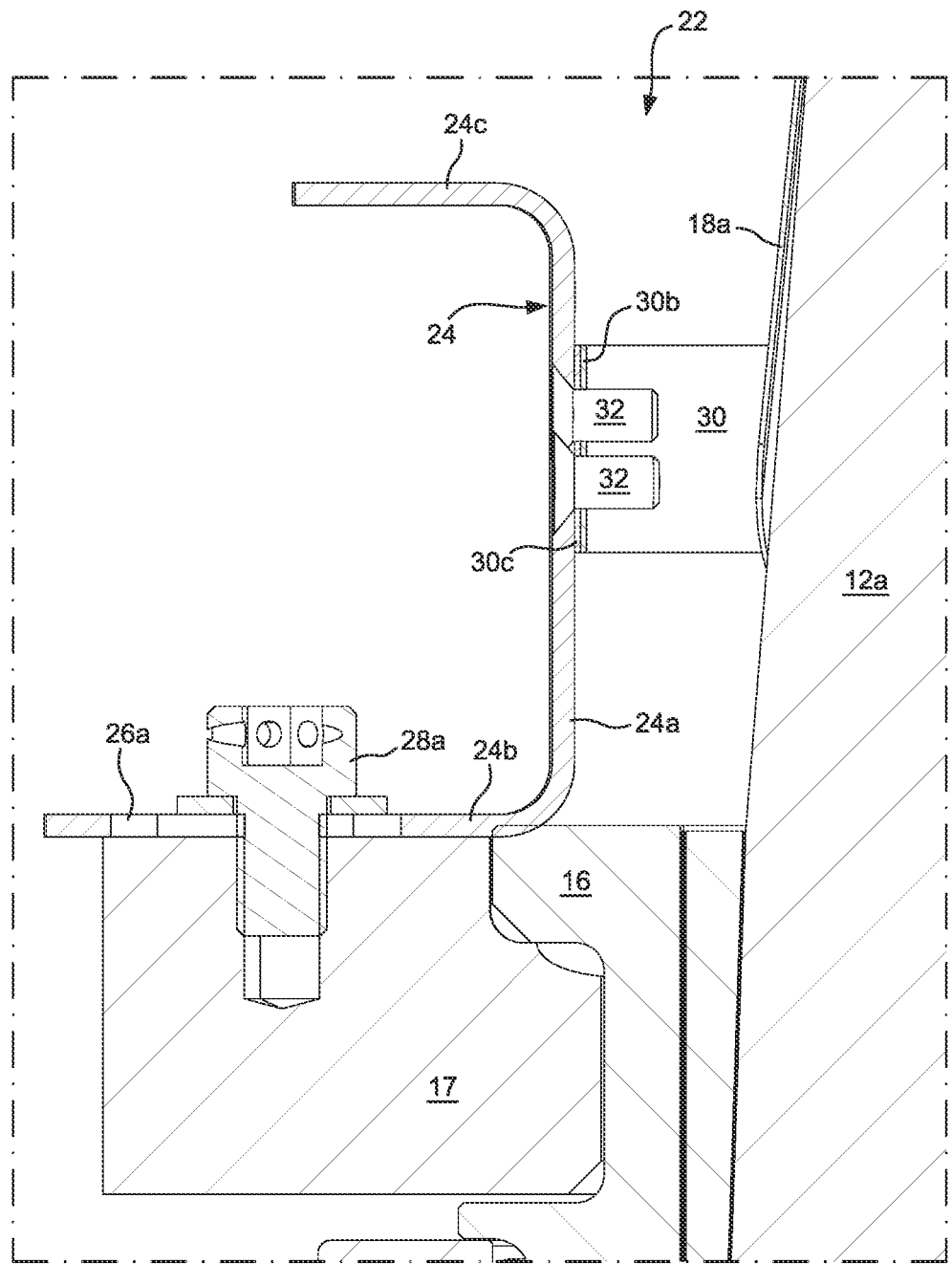
FIG. 4 is an enlarged cross-sectional elevational view of the bonding tab assembly in accordance with an embodiment of the invention as taken along lines 4-4 in FIG. 3.
Figure 5:
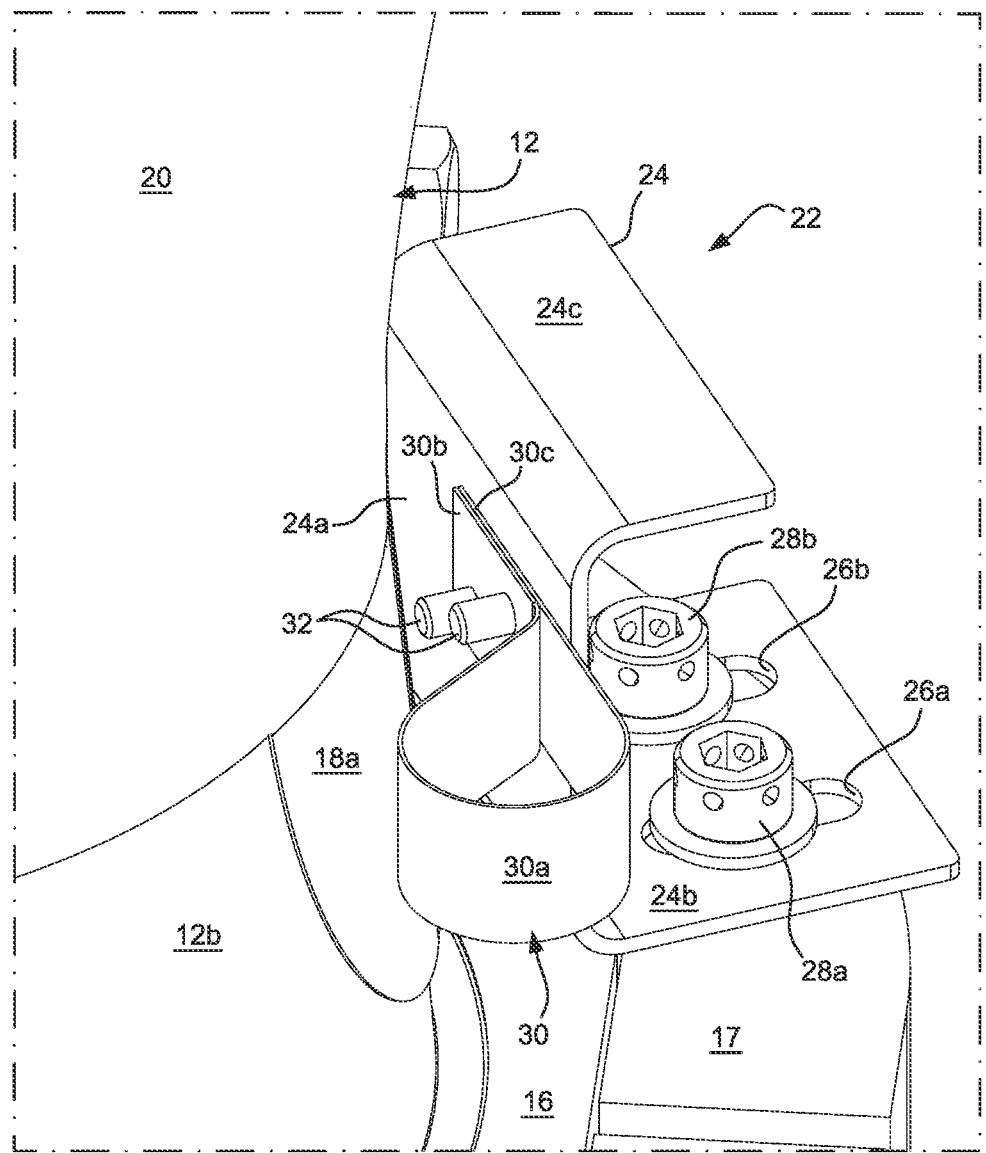
FIG. 5 is a detailed perspective view of the bonding tab assembly in accordance with an embodiment of the invention.
Figure 6:
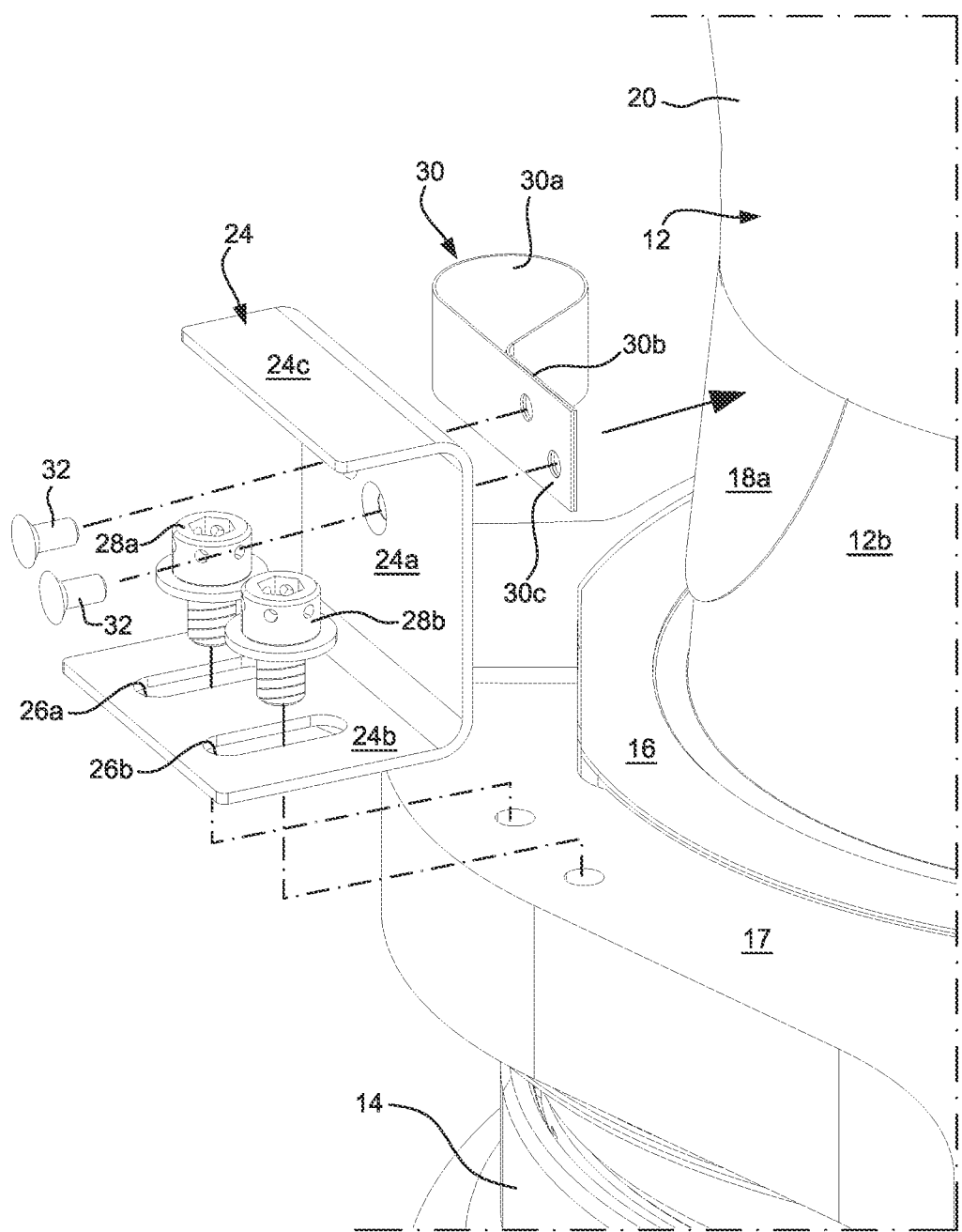
FIG. 6 is an exploded perspective view of the bonding tab assembly shown in FIG. 5.

Important to the embodiments disclosed herein, the propeller assembly 10 includes a bonding tab assembly 22 attached to the counterweight clamp 17. As is perhaps better shown in FIGS. 3-6, the bonding tab assembly 22 includes a one-piece mounting bracket 24 which includes an upright central support plate 24a integrally joined to lower and upper flanges 24b, 24c, respectively. The lower flange 24b includes a pair of parallel elongate slots 26a, 26b which are adapted to receive a mounting bolt 28a, 28b therein to positionally secure the bracket 24 to the counterweight clamp 17. The slots 26a, 26b allow the bracket 24 to be moved towards and away from (arrow $A_1$ in FIG. 3) so as to selectively position the bracket 24 relative to the proximal flared region 18a of the protective band 18 at which time the bolts 28a, 28b may be tightened to rigidly secure the bracket 24 to the collar 16.

A bonding tab 30 is fixed to the central support plate 24a of the mounting bracket 24 by suitable rivets 32 so as to be in facing contact with the proximal flared region 18a of the protective metal band 18. The bonding tab 30 is most preferably formed of a single (one-piece) strip of spring steel which is bent into a P-shaped geometric configuration such that a central region of the strip defines a leading arcuate bonding pad portion 30a while the opposite tail portions 30b, 30c are stacked in contact with one another and rigidly fixed to the support plate 24a by the rivets 32. The spring force exerted by the bonding pad portion 30a onto the proximal flared region 18a of the protective metal band 18 may be selectively increased or decreased by adjustably moving the mounting plate 24, and hence the support plate 24a to which the bonding tab 30 is attached towards or away, respectively, from the proximal flared region 18a in the direction of arrow $A_1$ as described previously. In such a manner, therefore, reliable contact will be maintained between the bonding pad portion 30a and the flared region 18a of the protective metal band 18.

It will be understood that an electrical pathway is provided by the protective band 18 from the tip 12a to the shank 12b of the propeller blade 12. The contact between the bonding pad portion 30a and the proximal flared region 18a of the protective metal band 18 will therefore extend such electrical path through the bracket 24, the counterweight clamp 17 and the blade collar 16 to the hub 14 (e.g., through bearings (not shown) provided in the hub 14). In such a manner, therefore, lightning protection is provided to the propeller blade 12.

While reference has been made to particular embodiments of the invention, various modifications within the skill of those in the art may be envisioned. Therefore, it is to be understood that the invention is not to be limited to the disclosed embodiments, but on the contrary, is intended to cover various modifications and equivalent arrangements included within the spirit and scope thereof.

What is claimed is:

1. A bonding tab assembly for electrically bonding a protective metal band affixed to a leading edge of a composite propeller blade to an associated propeller hub, the bonding tab assembly comprising:
    a mounting bracket having a lower mounting flange adapted to being attached to a counterweight clamp surrounding the propeller blade and an upright mounting plate; and
    a bonding tab attached to the upright mounting plate of the mounting bracket and adapted to being brought into spring-biased contact with a portion of the protective metal band affixed to the leading edge of the propeller blade, wherein
    the bonding tab is a single strip of metal formed into a P-shaped geometric configuration.

2. The bonding tab assembly according to claim 1, wherein the single strip of metal includes a central region which is bent into a leading arcuate contact pad that is adapted to be brought into spring-biased contact with the portion of the protective metal band affixed to the leading edge of the propeller blade.

3. The bonding tab assembly according to claim 2, wherein the single strip of metal includes opposite tail portions that are stacked and attached to the upright mounting plate of the mounting bracket.

4. A bonding tab assembly for electrically bonding a protective metal band affixed to a leading edge of a composite propeller blade to an associated propeller hub, the bonding tab assembly comprising:
    a mounting bracket having a lower mounting flange adapted to being attached to a counterweight clamp surrounding the propeller blade and an upright mounting plate; and
    a bonding tab attached to the upright mounting plate of the mounting bracket and adapted to being brought into spring-biased contact with a portion of the protective metal band affixed to the leading edge of the propeller blade, wherein
    the mounting bracket is adapted to being positionally adjusted towards and away from the protective metal band to adjust spring-biased force of the bonding pad thereagainst.

5. The bonding tab assembly according to claim 4, wherein the lower mounting flange includes at least one elongate aperture and at least one bolt received within the elongate aperture to attach the mounting flange to the counterweight clamp, wherein the at least one elongate aperture is oriented to allow adjustments of the mounting bracket towards and away from the propeller blade.

6. The bonding tab assembly according to claim 5, wherein the lower mounting flange includes a pair of parallel elongate apertures and a pair of bolts received within respective ones of the apertures to attach the mounting flange to the counterweight clamp, wherein the elongate apertures are oriented to allow adjustments of the mounting bracket towards and away from the propeller blade.

7. An aircraft propeller assembly comprising:
a propeller hub;
a composite propeller blade having leading and trailing edges, a tip and a shank;
a metallic blade collar at the shank of the propeller blade operably connected to the propeller hub;
a counterweight clamp attached to the propeller blade collar;
a protective metal band attached to the leading edge of the composite propeller blade and extending continuously from the tip to the shank thereof; and
a bonding tab assembly for electrically bonding the protective metal band affixed to a leading edge of a composite propeller blade to the propeller hub through the counterweight clamp and the blade collar, wherein the bonding tab assembly comprises:
(i) a mounting bracket having a lower mounting flange and an upright mounting plate, the lower mounting flange being attached to the counterweight clamp; and
(ii) a bonding tab attached to the upright mounting plate of the mounting bracket in spring-biased contact with a portion of the protective metal band affixed to the leading edge of the composite propeller blade, wherein
the bonding tab is a single strip of metal formed into a P-shaped geometric configuration.

8. The aircraft propeller assembly according to claim 7, wherein the single strip of metal includes a central region which is bent into a leading arcuate contact pad that is adapted to be brought into spring-biased contact with the portion of the protective metal band affixed to the leading edge of the propeller blade.

9. The aircraft propeller assembly according to claim 8, wherein the single strip of metal includes opposite tail portions that are stacked and attached to the upright mounting plate of the mounting bracket.

10. An aircraft propeller assembly comprising:
a propeller hub;
a composite propeller blade having leading and trailing edges, a tip and a shank;
a metallic blade collar at the shank of the propeller blade operably connected to the propeller hub;
a counterweight clamp attached to the propeller blade collar;
a protective metal band attached to the leading edge of the composite propeller blade and extending continuously from the tip to the shank thereof; and
a bonding tab assembly for electrically bonding the protective metal band affixed to a leading edge of a composite propeller blade to the propeller hub through the counterweight clamp and the blade collar, wherein the bonding tab assembly comprises:
(i) a mounting bracket having a lower mounting flange and an upright mounting plate, the lower mounting flange being attached to the counterweight clamp; and
(ii) a bonding tab attached to the upright mounting plate of the mounting bracket in spring-biased contact with a portion of the protective metal band affixed to the leading edge of the composite propeller blade, wherein
the mounting bracket is positionally adjustable towards and away from the protective metal band to adjust spring-biased force of the bonding pad thereagainst.

11. The aircraft propeller assembly according to claim 10, wherein the lower mounting flange includes at least one elongate aperture and at least one bolt received within the elongate aperture to attach the mounting flange to the counterweight clamp, wherein the at least one elongate aperture is oriented to allow adjustments of the mounting bracket towards and away from the composite propeller blade.

12. The aircraft propeller assembly according to claim 10, wherein the lower mounting flange includes a pair of parallel elongate apertures and a pair of bolts received within respective ones of the apertures to attach the mounting flange to the counterweight clamp, wherein the elongate apertures are oriented to allow adjustments of the mounting bracket towards and away from the composite propeller.

13. An aircraft which comprises the aircraft propeller assembly according to claim 7.

14. An aircraft which comprises the aircraft propeller assembly according to claim 10.

* * * * *